(12) United States Patent
Radu

(10) Patent No.: US 12,105,751 B2
(45) Date of Patent: Oct. 1, 2024

(54) FILE FORMAT IDENTIFICATION SYSTEM

(71) Applicant: CrowdStrike, Inc., Sunnyvale, CA (US)

(72) Inventor: Marian Radu, Jyvaskyla (FI)

(73) Assignee: CrowdStrike, Inc., Sunnyvale, CA (US)

( * ) Notice: Subject to any disclaimer, the term of this patent is extended or adjusted under 35 U.S.C. 154(b) by 183 days.

(21) Appl. No.: 17/748,906

(22) Filed: May 19, 2022

(65) Prior Publication Data

US 2023/0376526 A1    Nov. 23, 2023

(51) Int. Cl.
| | | |
|---|---|---|
| *G06F 16/11* | (2019.01) | |
| *G06F 9/30* | (2018.01) | |
| *G06F 16/51* | (2019.01) | |
| *G06F 16/55* | (2019.01) | |
| *G06N 20/00* | (2019.01) | |

(52) U.S. Cl.
CPC .......... *G06F 16/55* (2019.01); *G06F 9/30036* (2013.01); *G06F 16/116* (2019.01); *G06F 16/51* (2019.01); *G06N 20/00* (2019.01)

(58) Field of Classification Search
CPC .... G06F 16/1794; G06F 16/258; G06F 16/55; G06F 16/116
See application file for complete search history.

(56) References Cited

U.S. PATENT DOCUMENTS

| | | |
|---|---|---|
| 8,869,277 B2 | 10/2014 | Radinsky |
| 9,292,688 B2 | 3/2016 | Avasarala |
| 9,569,614 B2 | 2/2017 | Pieczul |
| 9,843,596 B1 | 12/2017 | Averbuch et al. |
| 9,864,956 B1 | 1/2018 | Sai |
| 10,055,582 B1 | 8/2018 | Weaver |
| 10,169,715 B2 | 1/2019 | Dirac et al. |
| 10,305,923 B2 | 5/2019 | McLane et al. |
| 11,126,720 B2 | 9/2021 | Miserendino |
| 2010/0153420 A1 | 6/2010 | Yang |
| 2016/0335435 A1* | 11/2016 | Schmidtler ............ G06N 20/00 |
| 2018/0032729 A1 | 2/2018 | Zhang |
| 2019/0007434 A1 | 1/2019 | McLane et al. |

(Continued)

OTHER PUBLICATIONS

F. Wang, T.-T. Quach, J. Wheeler, J. B. Aimone and C. D. James, "Sparse Coding for N-Gram Feature Extraction and Training for File Fragment Classification," in IEEE Transactions on Information Forensics and Security, vol. 13, No. 10, pp. 2553-2562, Oct. 2018, doi: 10.1109/TIFS.2018.2823697. (Year: 2018).*

(Continued)

*Primary Examiner* — Robert W Beausoliel, Jr.
*Assistant Examiner* — Nirav K Khakhar
(74) *Attorney, Agent, or Firm* — Lee & Hayes, P.C.

(57) ABSTRACT

A file format identification system can predict file formats associated with binary data. The file format identification system can extract n-grams, such as byte 4-grams, from the binary data. A trained neural network with at least one embedding layer can generate embedding arrays that correspond to the extracted n-grams. A trained file format classifier can compare values in the embedding arrays with patterns of values associated with known file formats. The trained file format classifier can accordingly determine which of the known file formats are most likely to be associated with the binary data.

20 Claims, 5 Drawing Sheets

(56) References Cited

U.S. PATENT DOCUMENTS

| | | |
|---|---|---|
| 2019/0213328 A1 | 7/2019 | Yahalom |
| 2019/0294452 A1 | 9/2019 | Herring, Jr. et al. |
| 2020/0005082 A1 | 1/2020 | Cazan et al. |
| 2023/0306114 A1* | 9/2023 | Ji .................... G06F 21/577 |
| 2023/0325501 A1* | 10/2023 | Chhetri ............. G06F 21/53 |
| | | 726/24 |
| 2023/0334154 A1 | 10/2023 | Cazan |

OTHER PUBLICATIONS

Wei-Jen Li, Ke Wang, S. J. Stolfo and B. Herzog, "Fileprints: identifying file types by n-gram analysis," Proceedings from the Sixth Annual IEEE SMC Information Assurance Workshop, West Point, NY, USA, 2005, pp. 64-71, doi: 10.1109/IAW.2005.1495935. (Year: 2005).*

Li et al., Fileprints: Identifying File Types by n-gram Analysis, Proceedings from the Sixth Annual IEEE SMC Information Assurance Workshop (2005, pp. 64-71) (Year: 2005).*

The Extended European Search Report mailed on Nov. 20, 2019 for European Patent Application No. 19177731.7, 10 pages.

Raff, et al., "An Investigation of Byte N-Gram Features for Malware Classification", Springer-Verlag France; Mar. 30, 2016; 20 pages.

Raff, et al., "Malware Detection by Eating a Whole EXE", University of Maryland, Oct. 25, 2017; 13 pages.

Sun et al., "Learning Fast and Slow: PROPEDEUTICA for Real-Time Malware Detection", arxic.org, Cornell University Library, Ithaca, NY, Dec. 4, 2017, 17 pages.

Office Action for U.S. Appl. No. 16/237,468, mailed on Jul. 21, 2022, Cazan, "Byte N-Gram Embedding Model", 11 pages.

Office Action for U.S. Appl. No. 16/237,468, mailed on Dec. 8, 2022, Radu Cazan, "Byte N-Gram Embedding Model", 11 pages.

Office Action for U.S. Appl. No. 18/213,141, mailed on Jan. 19, 2024, "File Format Identification System", 9 pages.

* cited by examiner

FILE FORMAT IDENTIFICATION SYSTEM

TECHNICAL FIELD

The present disclosure relates to processing binary data, particularly with respect to using byte n-grams extracted from binary data to identify file formats associated with data objects.

BACKGROUND

Digital files, such as binary data objects, may be formatted according to multiple file formats. For instance, image files can be formatted based on different file formats, such as JPEG, PNG, TIFF, GIF, BMP, and/or other image file formats. Other types of files, such as scripts, executable files, video files, audio files, document files, archive files, may also be formatted according to various file formats.

Operating systems, executable applications, and other elements of computing systems may be configured to open, execute, and/or operate on files that are formatted according to specific file formats. For example, a word processor application can be configured to open document files that are formatted according to one or more file formats that are supported by the word processor application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
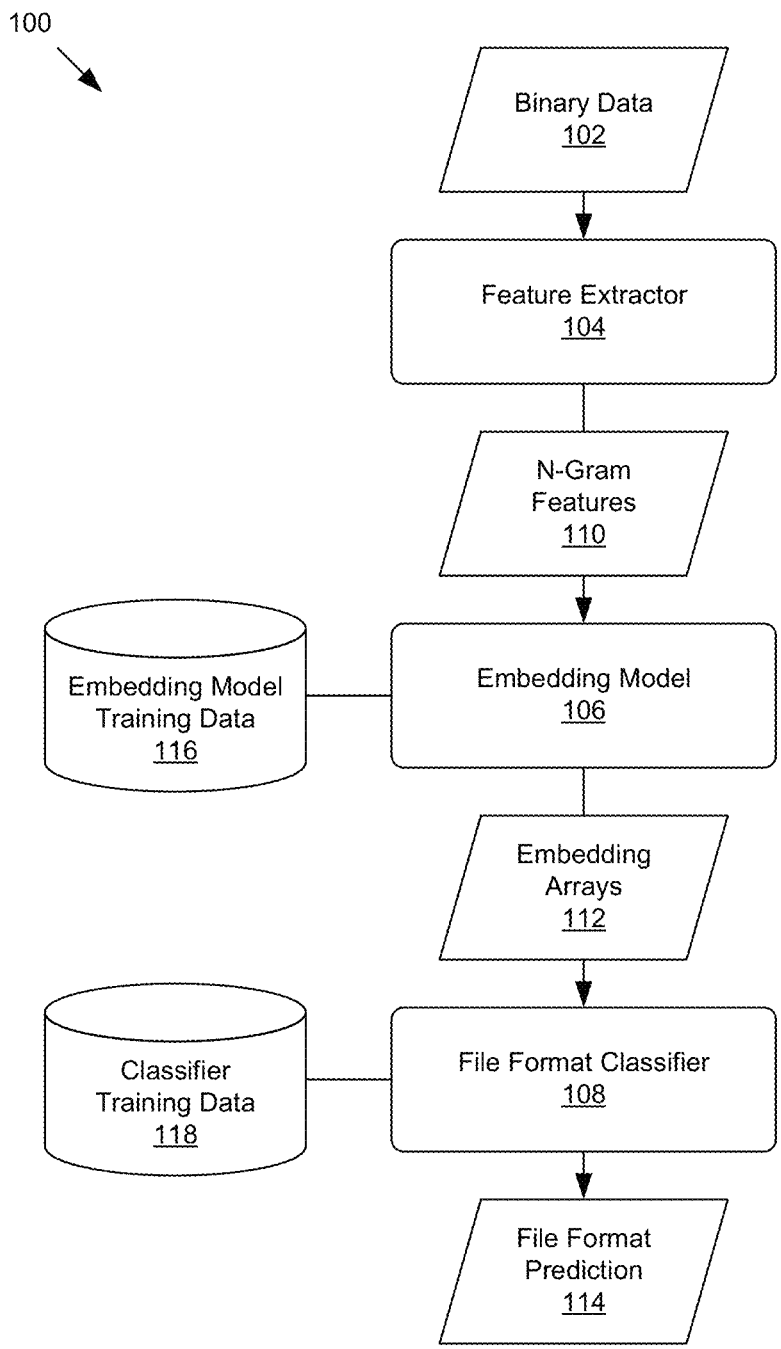
FIG. 1 shows an example of a file format identification system configured to identify one or more file formats associated with binary data.

A file format identification system, as described herein, can be configured to identify file formats that are likely associated with binary data. The file format identification system can use an embedding model to generate embedding arrays from n-grams, such as byte 4-grams or other byte n-grams, extracted from the binary data. The file format identification system can also use a file format classifier to compare values in the embedding arrays, generated from the extracted n-grams, with patterns of values that are associated with known file formats. Based on similarities between the values in the embedding arrays and the patterns associated with the known file formats, the file format identification system can predict which of the known file formats, if any, are most likely to be associated with the binary data.

Binary data, such as data files, scripts, data blobs, data streams, and/or other forms of digital data can be associated with one or more file formats. As an example, binary data objects may be executable files formatted according to file formats such as the Portable Executable (PE) file format used in Microsoft® Windows®, the Executable and Linkable Format (ELF) file format used in Linux®, or the Mach-O file format used in Apple® operating systems like macOS® and iOS®. As another example, binary data objects may be image files formatted according to file formats such as JPEG, PNG, TIFF, GIF, BMP, and/or other file formats. In still other examples, binary data objects may include documents, scripts, audio, video, compressed archives, and/or other types of data that can be formatted accordingly to many different file formats.

In some examples, a single binary data object may be associated with multiple file formats. As an example, a JPG image can be embedded into a DOCX file that can be opened using the Microsoft® Word® word processor application. As another example, a compressed archive file, such as a ZIP file, can contain multiple files formatted according to one or more file formats.

In some conventional systems, it can be difficult to identify file formats associated with binary data. For example, some operating systems use file extensions to signify file formats, but file extensions can be intentionally or unintentionally altered such that a file extension of a file may not actually indicate the file format of the file. Some file formats can be indicated by metadata, such as header data, associated with files, but such metadata can similarly be intentionally or unintentionally altered so that the metadata does not indicate the file format of a file.

Other file formats may be indicated by prefixes, codes, or other sequences of data within binary data of a file. For instance, an image file format may specify that the binary data of an image file, formatted according to the image file format, begin with a particular binary sequence associated with the image file format. Accordingly, any file that begins with the binary sequence associated with the image file format can be identified as an image file formatted according to that image file format. However, if such a prefix or sequence that signifies a file format is removed or edited in the binary data of a file, intentionally or via transmission or storage errors, it may be difficult for conventional systems to determine the file format of the file even if the rest of the binary data remains fully or predominantly intact.

Other conventional systems for identifying file formats may use file format parsers that are hard-coded to identify files that comply with specifications of corresponding file formats. However, if a file is missing metadata that indicate the file format of the file, or is a partial file, a corrupted file, or a file that has been altered to obfuscate a file format, such conventional file format parsers may not be able to identify the correct file format of the file. Such conventional file format parsers may also be configured to determine a single file format for a file, and therefore not be able to determine that a file, such as a ZIP archive of files of multiple file formats, is associated with multiple file formats.

However, the systems and methods described herein can use n-grams extracted from binary data to predict file types that are likely to be associated with binary data, even if the binary data is associated with a partial file, has missing or altered metadata, is associated with multiple file types, does not fully conform to file type specifications, and/or otherwise may pose challenges for other types of file format identification systems. As noted above, the systems and methods described herein can use n-grams, such as byte 4-grams or other byte n-grams, extracted from the binary data. The extracted n-grams can be used, by a trained embedding model with one or more embedding layers of a neural network, to generate corresponding embedding arrays. A trained file format classifier, such as another neural network or other machine learning model, can compare values in the embedding arrays generated from the extracted n-grams with patterns of values associated with known file formats. The trained file format classifier can accordingly determine which of the known file formats, if any, are most likely to be associated with the binary data.

FIG. 1 shows an example of a file format identification system 100 configured to identify one or more file formats associated with binary data 102. The file format identification system 100 can include a feature extractor 104, an embedding model 106, and a file format classifier 108. The feature extractor 104 can be configured to extract n-gram features 110 from the binary data 102. The embedding model 106 can be a neural network that has been trained to use the extracted n-gram features 110 to generate corresponding embedding arrays 112 associated with the binary data 102. The embedding arrays 112 can be vectors, arrays, matrices, or other lists or collections of values generated by the embedding model 106 based on the extracted n-gram features 110. The file format classifier 108 can also be a neural network or other type of machine learning model. The file format classifier 108 can be trained to use the embedding arrays 112, generated by the embedding model 106 based on the n-gram features 110 extracted from the binary data 102, to generate a file format prediction 114 associated with the binary data 102. The file format prediction 114 can indicate any file formats that have at least a threshold likelihood of being associated with the binary data 102.

The binary data 102 can be a data file, a script, a data blob, a data stream, unstructured data, or other form of digital data. The binary data 102 can be expressed using bits, and can thus include groupings of eight bits known as bytes. Each byte may include two four-bit nibbles. In some examples, the binary data 102 can be a single file. In other data, the binary data 102 can be a data stream or other collection of data that may be associated with more than one file. For example, the binary data 102 may be a data dump, and it may not be initially apparent how many files, and/or what file formats, are in the data dump. However, as described herein, the file format identification system 100 can process full or partial files in the binary data 102, such that the file format identification system 100 can identify one or more file formats associated with the binary data 102.

In some examples, the elements of the file format identification system 100, such as the feature extractor 104, the embedding model 106, and the file format classifier 108, can execute locally on a computing device to identify file formats of binary data locally stored and/or processed on the computing device. As an example, the file format identification system 100 can operate as a part of, in association with, an operating system of the computing device. Accordingly, the file format identification system 100 can determine file formats of data objects that include binary data, such that the operating system can determine how to process the data objects, determine which applications can open or execute the data objects, or otherwise determine how to operate in association with the data objects based on the file formats of the data objects. As another example, the file format identification system 100 can operate as a part of, in in association with, an antivirus program or other digital security agent executing on the computing device. Accordingly, the file format identification system 100 can determine file formats of data objects, such that a digital security agent can evaluate whether file formats of data objects have been changed or obfuscated, or otherwise process or evaluate data objects based on the based on the file formats determined by the file format identification system 100. Such a digital security agent may also use the file format identification system 100 to identify file formats of binary data being sent from, or received by, the computing device. A digital security agent on a computing device can also use the file format identification system 100 to determine if files of certain file formats are being loaded onto removable storage attached to the computing device, are being attached to entails or other messages being sent from the computing device, or are being hidden inside files of other file formats.

In other examples, the elements of the file format identification system 100, such as the feature extractor 104, the embedding model 106, and the file format classifier 108, can operate on a server, a cloud computing element, a firewall, or other remote computing system. As an example, the file format identification system 100 may operate on a remote server of digital security network that receives binary data sent by local digital security agents executing on one or more local computing devices. For instance, if a local digital security agent sends binary data to the remote server, the remote server can use the file format identification system 100 to determine file formats of the binary data, such that the remote server can use the file formats of the binary data to determine how to further process, evaluate, or store the binary data in the digital security network. In some examples, a local security agent executing on a computing device can use a local instance of the file format identification system 100 to identify files of certain file formats, and transmit those files to the remote server of the digital security network for further analysis.

As discussed above, the feature extractor 104 of the file format identification system 100 can be configured to extract n-gram features 110 from the binary data 102. The n-gram features 110 can be byte n-grams of n bytes that occur in sequence in the binary data 102, such as byte 2-grams that include two consecutive bytes, byte 4-grams that include four consecutive bytes, or other byte n-grams based on any other value of n greater than or equal to one. As an example, a byte 4-gram can include 32 bits associated with four consecutive bytes in the binary data 102. Each byte may include two four-bit nibbles, such that an overall byte 4-gram can be represented as eight nibbles. Each nibble of the byte 4-gram may be represented as a single hexadecimal digit (0-F) or as an integer between 0 and 15.

The feature extractor 104 can extract byte n-grams from the binary data 102 using a 1-byte sliding window. For example, if the n-grams are byte 4-grams, the n-gram features 110 extracted by the feature extractor 104 can include a first 4-gram that includes bytes one through four of the binary data 102, a second 4-gram that includes bytes two through five of the binary data 102, a third 4-gram that includes bytes three through six of the binary data 102, and so on. Accordingly, in some examples, if the data object 102 has x bytes, the feature extractor 104 can extract x-3 byte 4-grams from the binary data 102 using the 1-byte sliding window.

Some or all of the byte n-grams extracted by the feature extractor 104 from the binary data 102 can be provided to the embedding model 106 as n-gram features 110 associated with the binary data 102. The embedding model 106 can be a byte n-gram embedding model that is based on a neural network, and is configured to use the n-gram features 110 provided by the feature extractor 104 to generate corresponding embedding arrays 112. Examples of the feature extractor 104 and the embedding model 106, such as a feature extractor extracting byte n-gram features from binary data and a byte n-gram embedding model generating embedding arrays based on extracted byte n-gram features, are described in U.S. patent application Ser. No. 16/237,468, entitled "BYTE N-GRAM EMBEDDING MODEL" and filed on Dec. 31, 2018, which is hereby incorporated by reference.

The embedding model 106 can be a neural network that has been trained on embedding model training data 116. The embedding model training data 116 can include a set of reference data files, and a set of n-gram features that have been extracted by the feature extractor 104 from the binary data of the set of reference data files. The embedding model 106 can be trained to predict probabilities that individual n-grams occur within the binary data of the set of reference data files in the embedding model training data 116. As described further below, after the embedding model 106 has been trained on the embedding model training data 116, the trained embedding model 106 can be used in the file format identification system 100 to generate embedding arrays 112 associated with n-gram features 110 that the feature extractor 104 extracts from other binary data, such as the binary data 102.

The neural network of the embedding model 106 can include one or more embedding layers and a final layer. Each embedding layer of the neural network can be a layer that processes input data, based on the training of the neural network, and that generates output data, such as an embedding array, that can be used as input data for a subsequent embedding layer or to the final layer. For instance, output from a first embedding layer can be used as input to a second embedding layer, and output from the second embedding layer can be used as input to the final layer. The neural network of the embedding model 106 can also include, or be associated with, a regressor. The regressor can train the neural network, for instance by adjusting weights and/or other parameters of the embedding layers and/or the final layer, to determine probabilities of occurrences of n-gram features indicated by the embedding model training data 116.

For example, for a particular byte n-gram indicated by the set of n-gram features in the embedding model training data 116, the regressor can train the neural network to determine a number of reference files (or a representation thereof, such as a logarithm or scaled logarithm) in which the particular byte n-gram appears in the embedding model training data 116. The embedding model 106 can accordingly be trained to predict a natural occurrence probability of a particular byte 4-gram, or other byte n-gram. The regressor can continue to train the neural network, using n-gram features in the embedding model training data 116, until output from the final layer of the neural network is sufficiently consistent with the embedding model training data 116. For example, training of the neural network can continue until the final layer of the neural network outputs, for input byte n-grams in the embedding model training data 116, values representing natural occurrence probabilities that are within a threshold accuracy of known probabilities of occurrences of those byte n-grams within the embedding model training data 116.

The training of the embedding model 106 can adjust and determine how the embedding layers of the embedding model 106 generate, for each input n-gram feature, corresponding embedding arrays. An embedding array can be output produced by an embedding layer that can be used as input for a subsequent embedding layer of the neural network, or as input for the final layer of the neural network that predicts the occurrence probability. As a non-limiting example, the neural network of the embedding model 106 can include two embedding layers prior to a final output layer, and each of the embedding layers can produce an embedding array of 64 output values that can be used by the subsequent embedding layer or the final output layer. In other examples, the neural network of the embedding model 106 can include any other number of embedding layers, and/or each of the embedding layers can produce an embedding array of any other number of output values.

Accordingly, once the embedding model 106 has been trained on the embedding model training data 116 to predict probabilities of occurrences of n-gram features indicated by the embedding model training data 116, the embedding layers of the embedding model 106 can have been trained to generate embedding arrays that can be used to predict the probability occurrences. After training, one or more embedding layers of the trained embedding model 106 can thus also generate embedding arrays 112 based on the n-gram features 110 of binary data, such as the binary data 102, that is not in the embedding model training data 116.

As an example, after the embedding model 106 has been trained on the embedding model training data 116, n-gram features 110 extracted from the binary data 102 can be provided to the embedding model 106. One or more embedding layers of the bedding model 106, which may precede a final layer of the trained embedding model 106 as discussed above, can generate and output embedding arrays 112 associated with provided n-gram features 110.

Embedding arrays 112 associated with the binary data 102, generated by the embedding model 106, can be used by the file format classifier 108 to generate the file format prediction 114 for the binary data 102, as discussed further below. The file format classifier 108 can be a machine learning model that has been trained on classifier training data 118 to determine file formats associated with embedding arrays.

The classifier training data 118 can include reference embedding arrays that correspond with known file formats. For example, a set of reference JPEG files can be provided to the feature extractor 104, such that the feature extractor 104 can extract reference n-gram features from the reference JPEG files. The reference n-gram features extracted from the reference JPEG files can be provided to the trained embedding model 106, such that the trained embedding model 106 can use the extracted reference n-gram features to generate corresponding reference embedding arrays. Accordingly, the embedding model 106 can generate, from n-gram features extracted from a set of reference JPEG files, a set of reference embedding arrays that are associated with the JPEG file format. Sets of reference files of other file formats can similarly be provided to the feature extractor 104 and the embedding model 106, such that the embedding model 106 can use n-gram features extracted from the reference files to generate reference embedding arrays that are associated with the corresponding file formats. Reference embedding arrays that correspond with different file formats can accordingly be used as the classifier training data 118 to train the file format classifier 108, as discussed further below.

The file format classifier 108 can be based on convolutional neural networks, recurrent neural networks, other types of neural networks, nearest-neighbor algorithms, regression analysis, deep learning algorithms, Gradient Boosted Machines (GBMs), Random Forest algorithms, and/or other types of artificial intelligence or machine learning frameworks. The file format classifier 108 can be trained, based on the classifier training data 118, to predict the file formats associated with the reference embedding arrays in the classifier training data 118. For example, the file format classifier 108 may be trained using supervised machine learning techniques until the file format classifier 108 can accurately predict the file formats associated with the reference embedding arrays in the classifier training data 118 to at least a threshold degree of accuracy.

Figure 2:
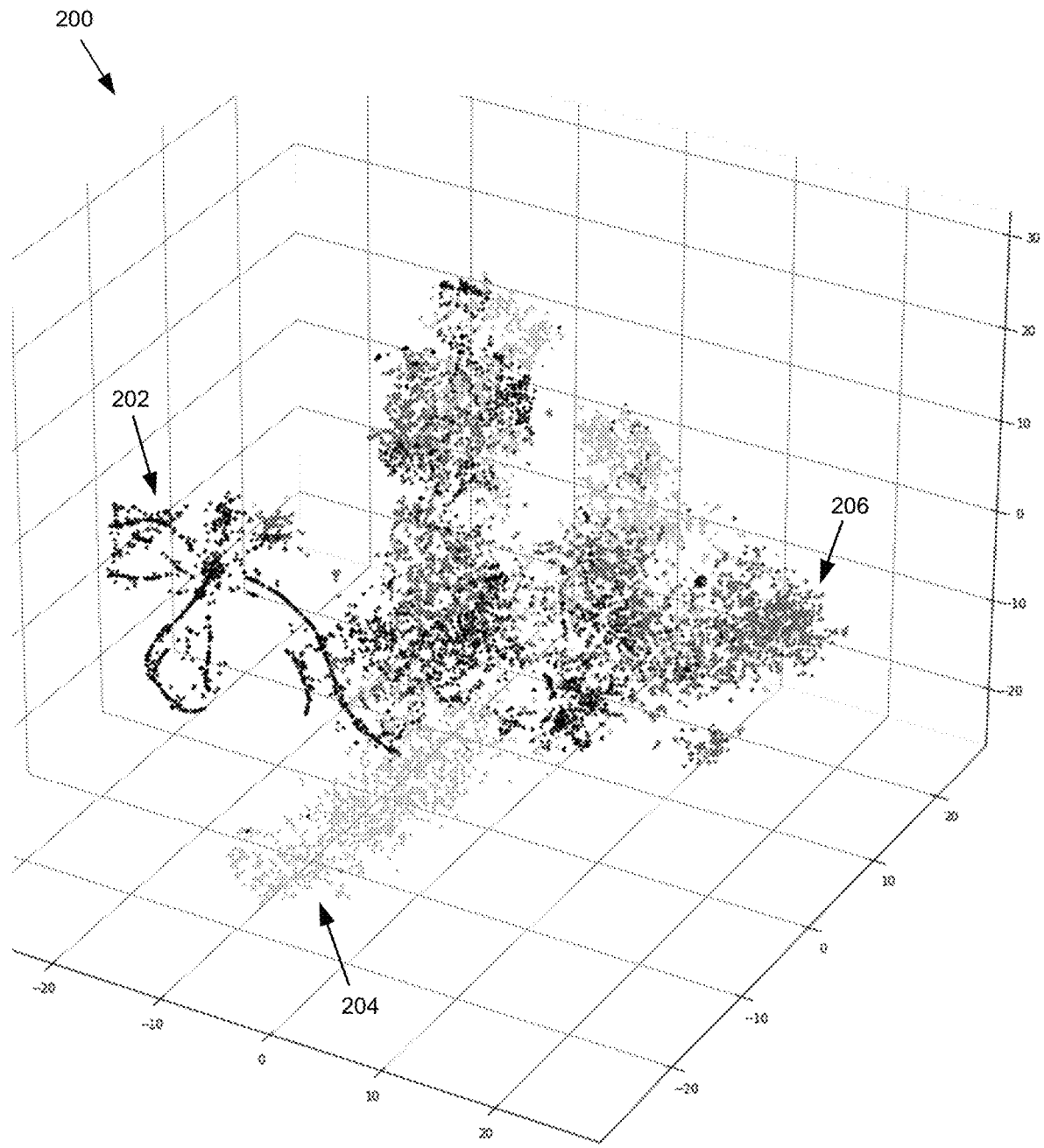
FIG. 2 shows an example graph that represents, in three-dimensional space, values in embedding arrays generated from n-gram features extracted from binary data associated with different executable file formats.

In some examples, the file format classifier 108 may determine, based on being trained on the classifier training data 118, spatial patterns of values in embedding arrays that are indicative of corresponding file formats. As a non-limiting example, FIG. 2 shows an example graph 200 that represents, in three-dimensional space, values in embedding arrays generated from n-gram features extracted from binary data associated with different executable file formats, including the Mach-O file format (black dots), the PE file format (dark gray dots), and the ELF file format (light gray dots). As discussed above, an embedding array generated from an extracted n-gram may include 64 values, or any other number of values. For illustration purposes, example graph 200 shows three-dimensional representations of down-selections of three values for each embedding array. However, the file format classifier 108 may evaluate representations of the embedding arrays in 64 dimensions, or any other number of dimensions that corresponds to the number of values in each embedding array.

As shown in FIG. 2, embedding arrays generated from n-gram features extracted from binary data associated with different file formats can have different spatial patterns. For instance, embedding arrays associated with n-gram features of Mach-O files can have a first spatial pattern 202 that includes a shape resembling a flower or a firework, as shown in FIG. 2. Embedding arrays associated with n-grain features of ELF files can have a second spatial pattern 204 that includes a protrusion that generally extends further toward one of the three dimensions than the embedding arrays of Mach-O files or PE files, as shown in FIG. 2. Embedding arrays associated with n-gram features of PE files can have a third spatial pattern 206 that includes a cluster that generally extends further toward another of the three dimensions than the embedding arrays of Mach-O files or ELF files, as shown in FIG. 2. Although FIG. 2 shows an example in which the file format classifier 108 is trained to identify distinct multi-dimensional patterns of values in embedding arrays derived from Mach-O files, ELF files, and PE files, the file format classifier 108 can also be trained to identify multi-dimensional patterns of values in embedding arrays derived from reference files of additional, and/or alternate, file formats.

The file format classifier 108 can accordingly be trained on the classifier training data 118 to determine spatial patterns and/or other patterns associated with values indicated by embedding arrays that correspond to different known file formats, and/or to determine thresholds or differences between such patterns. Accordingly, after the file format classifier 108 has been trained to determine which values indicated by embedding arrays may be indicative of corresponding known file formats, the file format classifier 108 can receive new embedding arrays 112 derived from the binary data 102 that is not in the classifier training data 118. The file format classifier 108 can compare the values of the embedding arrays 112 with the patterns of the known file formats, and accordingly determine which of the file formats are most likely to be associated with the binary data 102. As an example, if the embedding model 106 generates embedding arrays 112 associated with the binary data 102 that include values that have spatial representations that primarily fall within, or near, the second spatial pattern 204 associated with ELF files, the file format classifier 108 can determine that the binary data 102 is most likely to be an ELF file. Accordingly, the file format prediction 114 generated by the file format classifier 108 can indicate that the file format of the binary data 102 is the ELF file format.

The file format classifier 108 may determine that values in embedding arrays 112 derived from the binary data 102 fall into, or are close to, patterns associated with multiple file formats. In some examples, the file format classifier 108 may determine confidence scores, similarity scores, or probability values that indicate how closely the values in the embedding arrays 112 correspond with values associated with known file formats. For example, the file format classifier 108 may indicate that, based on a comparison of the values of the embedding arrays 112 derived from the binary data 102 against patterns of values in reference embedding arrays associated with known executable file formats, that the binary data 102 is 90% likely to be an ELF file, 80% likely to be a PE file, and 25% likely to be a Mach-O file. Such confidence levels or probability values associated with one or more file formats may be included in the file format prediction 114 for the binary data 102 output by the file format classifier 108. In some examples, the file format classifier 108 may determine a set of confidence levels indicating how likely the binary data 102 is to be associated with each of the file formats the file format classifier 108 has been trained to identify.

The file format prediction 114 can be provided as output of the file format identification system 100, such that an operating system, application, or other element can use the file format prediction 114 associated with a file to determine the likely file format of the file. In other examples, an operating system, application, or other element can use the file format prediction 114 to determine that the binary data 102 includes portions of data formatted according to multiple file formats, and thus determine how to open or process the portions of data. In still other examples, the file format prediction 114 can be stored as a report or other file, and/or be displayed via a user interface associated with the file format identification system 100.

In some examples, the file format classifier 108 can associate file formats with corresponding threshold values, such that the file format classifier 108 may indicate a particular file format in the file format prediction 114 if a confidence level meets or exceeds the threshold value for that particular file format. For instance, if a confidence level for the JPEG file format is 75%, and the file format classifier 108 determines that that a first data object is 90% likely to be a JPEG file, the file format classifier 108 may include the JPEG file format in the file format prediction 114 for the first data object. However, if the file format classifier 108 determines that that a second data object is only 65% likely to be a JPEG file, the file format classifier 108 may omit the JPEG file format from the file format prediction 114 for the second data object. The threshold values associated with a file format may be determined during the training of the file format classifier 108 on the classifier training data 118.

In some examples, the file format classifier 108 may determine that confidence levels associated with file formats for a particular set of binary data do not exceed any of the corresponding threshold values. For instance, a set of binary data may be a data dump of random bits, and thus have low probabilities of being associated with any of the known file formats that do not exceed corresponding threshold values. Accordingly, the file format classifier 108 may output a file format prediction 114 indicating that the set of binary data is not likely to be associated with any of the file formats that the file format classifier 108 has been trained to identify.

Accordingly, overall, the file format identification system 100 can receive the binary data 102, such as file or other data from a data stream, a directory, or other location, and use the feature extractor 104 to extract n-gram features 110 from the binary data 102. The embedding model 106 of the file format identification system 100 can use the n-gram features 110 to generate corresponding embedding arrays 112. The file format classifier 108 can use the embedding arrays 112 as input, compare values in the embedding arrays 112 against patterns of similar values in reference embedding arrays associated with a set of known file formats, and generate the corresponding file format prediction 114 indicating which of the known file formats, if any, are most likely to be associated with the binary data 102.

In some examples, the file format identification system 100 can identify the file format of a file even if the file is a partial file, includes errors, or is not formatted in full compliance with the specification of the file format. In some examples, conventional file parsers configured to detect files of certain file formats may reject or be unable to process partial files, corrupted, or ill-formatted files. However, the file format identification system 100 described herein can use the extracted n-gram features 110 to identify file formats of such partial files, corrupted files, or ill-formatted files.

For example, if the binary data 102 is part of a stream of data that is still being received by a computing device, the file format identification system 100 can begin extracting individual n-gram features 110, such as byte 4-grams, from received portions of the binary data 102 using the 1-byte sliding window before the full stream of data has been received. Accordingly, the embedding model 106 can begin generating embedding arrays 112 associated with the received binary data 102, and the file format classifier 108 can use the embedding arrays 112 to identify the likeliest file formats associated with the received binary data 102. As such, the file format classifier 108 can identify file formats of partially-downloaded files before the files are fully downloaded.

As another example, even if some portions of a file are corrupted due to transmission errors, storage errors, malicious interference, or other reasons, many of the original bytes of the corrupted file may still be intact. Accordingly, a set of n-gram features 110 extracted from the non-corrupted portions of the file may be sufficient to allow the file format identification system 100 to identify the file format of the file.

As yet another example, a specification for a particular file format may indicate that the first two bytes of the binary data of files of that file format are to express a specific prefix value that identifies the particular file format. However, because the feature extractor 104 extracts n-gram features 110 using a 1-byte sliding window, most of the n-gram features 110 can be extracted from positions within the binary data 102 that follow the first two bytes where the specific prefix value would be expected. Accordingly, values of embedding arrays 112 generated from n-gram features 110 extracted from the later byte positions in the binary data 102 can indicate to the file format classifier 108 that the binary data 102 is associated with the particular file format, even if the two-byte prefix value that may otherwise indicate the particular file format has been altered or is missing in the binary data 102.

Additionally, the file format identification system 100 can also identify multiple file formats associated with the binary data 102. For example, if the binary data 102 is a compressed archive file that contains a document file and an image file, the file format identification system 100 can extract n-gram features 110 that may be associated with the overall archive file, as well as n-gram features 110 that may be associated with individual portions of the archive file that include binary data for the document file and for the image file. The embedding model 106 can accordingly generate embedding arrays 112 from the n-gram features 110 extracted from different portions of the overall file, which the file format classifier 108 can use to determine that the binary data 102 includes portions associated with a particular archive file format, a particular document file format, and a particular image file format.

The file format identification system 100 described herein can thus be configured to determine whether the binary data 102 is associated with any of the file formats that the file format classifier 108 has been trained to identify, even if the binary data 102 is not a complete file, contains errors, or is not formatted in full compliance with one or more file formats. Accordingly, the file format identification system 100 can be trained to identify binary data associated with multiple file formats, and can be used instead of or in addition to conventional file parsers that are hard coded to identify files of specific file formats. As a non-limiting example, if conventional file parsers executing on a computing system are unable to identify the file format of a file, the computing system can use the file format identification system 100 to predict the most likely file format associated with the file. As another non-limiting example, a computing system can use the file format identification system 100 to predict the most likely file formats associated with files in lieu of using conventional file parsers associated with distinct file formats.

The file format identification system 100 may be configured, in some examples, the have the embedding model 106 process a subset of the full set of n-gram features 110, and/or have the file format classifier 108 process a subset of the embedding arrays 112 generated by the embedding model 106. For example, rather than the embedding model 106 generating embedding arrays 112 for all of the n-grams that could be extracted from the binary data 102, and the file format classifier 108 comparing the values of all of those embedding arrays 112 against patterns that correspond to known file formats, the file format identification system 100 may be configured to only process a representative subset of the n-grams that could be extracted from the binary data 102. As a non-limiting example, embedding arrays 112 that correspond to a representative sample of 20%, or another representative sample, of the n-grams in the binary data 102 may be sufficient to determine a general pattern associated with the binary data 102 that can be compared to patterns of known file formats to predict the file format of the binary data 102.

In some examples, feature engineering can be performed to determine which types of input to the embedding model 106 and/or the file format classifier 108, such as which values in extracted n-grams and/or which types of values in corresponding embedding arrays 112, are the most predictive of corresponding file formats. Accordingly, elements of the file format identification system 100 can be configured to ignore n-grams or corresponding embedding arrays 112 that have values that are relatively common across different formats, but evaluate n-grams or corresponding embedding arrays 112 that include less common values and that may therefore be more likely to be indicative of particular file formats.

As discussed above, the embedding model 106 and the file format classifier 108 can be machine learning models that are trained, respectively, on embedding model training data 116 and classifier training data 118. A process for training the embedding model 106 and the file format classifier 108 is discussed further below with respect to FIG. 3. After the embedding model 106 and the file format classifier 108 have been trained, instances of the trained embedding model 106 and file format classifier 108 can be deployed in instances of the file format identification system 100 on local computing devices, remote servers, and/or other computing systems. For example, instances of the file format identification system 100 on such computing systems may omit the embedding model training data 116 and classifier training data 118 shown in FIG. 1, as the instances of the file format identification system 100 can include the feature extractor 104, a trained instance of the embedding model 106, and a trained instance of the file format classifier 108. Such a deployed instance of the file format identification system 100 can also execute to predict file formats associated with provided binary data, for example as discussed further below with respect to FIG. 4.

Figure 3:
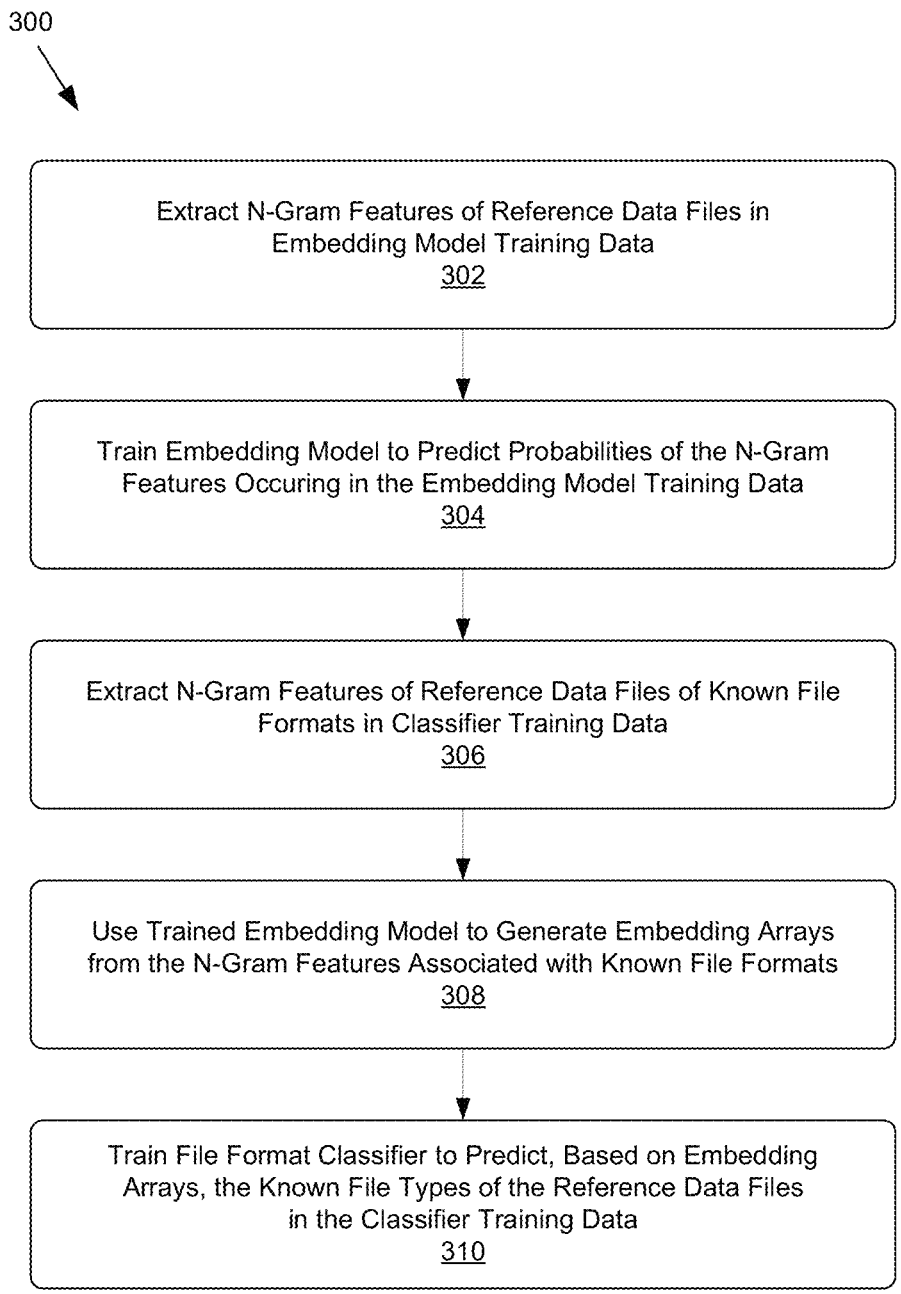
FIG. 3 shows a flowchart of an example process for training elements of the file format identification system.

FIG. 3 shows a flowchart of an example process 300 for training elements of the file format identification system 100. The example process 300 shown in FIG. 3 may be performed by a computing system, such as the computing system shown and described with respect to FIG. 5, configured to train the embedding model 106 and the file format classifier 108 of the file format identification system 100.

At block 302, the computing system can use the feature extractor 104 to extract n-gram features from a set of reference data files in the embedding model training data 116. As discussed above, the feature extractor 104 can be configured to extract byte n-grams from binary data of the reference data files using a 1-byte sliding window. The byte n-grams extracted from the reference data files by the feature extractor 104 at block 302 can be used, as n-gram features, to train the embedding model 106.

At block 304, the computing system can train the embedding model 106 to predict probabilities of the n-gram features, extracted at block 302, occurring in the set of reference data files in the embedding model training data 116. For example, for a particular n-gram feature extracted by the feature extractor 104, a regressor can train the neural network of the embedding model 106 to predict the number of reference data files in the embedding model training data 116 in which the particular n-gram feature appears. The regressor can accordingly train the neural network of the embedding model 106 to determine probabilities of occurrences of n-gram features indicated by the embedding model training data 116. The computing system continue training the embedding model 106 at block 304 until output of the embedding model 106, corresponding with the n-gram features extracted at block 302, indicates occurrence probabilities that are within a threshold accuracy of known probabilities of occurrences of those n-gram features indicated by the embedding model training data 116.

At block 306, the computing system can use the feature extractor 104 to extract n-gram features from a set of reference data files in the classifier training data 118. As discussed above, the feature extractor 104 can be configured to extract byte n-grams from binary data of the reference data files using a 1-byte sliding window. The byte n-grams extracted from the reference data files by the feature extractor 104 at block 308 can be used, as n-gram features, as input to the embedding model 106 trained at block 304. The reference data files in the classifier training data 118 can be associated with a set of known file formats. Accordingly, the byte n-grams extracted from those reference data files at block 306 can be associated with corresponding known file formats.

At block 308, the computing system can use the embedding model 106, trained at block 304, to generate embedding arrays from the n-gram features extracted from the classifier training data 118 at block 306. For example, during the training of the embedding model 106 at block 304, one or more embedding layers that precede a final output layer of the embedding model 106 can have been trained to generate embedding arrays that correspond to input n-gram features. Accordingly, after the embedding model 106 is trained at block 304, the embedding layers of the trained embedding model 106 can process the n-gram features extracted from the classifier training data 118 at block 306 to generate embedding arrays that correspond to the extracted n-gram features. As discussed above, the byte n-grams extracted from the reference data files at block 306 can be associated with known file formats. Accordingly, the embedding arrays generated by the trained embedding model 106 at block 308 from the extracted byte n-grams can also be associated with the known file formats.

At block 310, the computing system can train the file format classifier 108 to predict, based on the embedding arrays generated by the trained embedding model 106 at block 308, the known file formats of the reference data files in the classifier training data 118. In some examples, the file format classifier 108 can be trained, using machine learning techniques, until the file format classifier 108 generates file format predictions from input embedding arrays that indicate the file formats of the reference data files in the classifier training data 118 to at least a threshold degree of accuracy. The file format classifier 108 can, in some examples, be trained to identify spatial patterns, or other patterns, of multi-dimensional values in the embedding arrays that may be predictive of the corresponding file formats.

Although process 300 is described herein as being performed by one computing system in some examples different computing systems may execute different steps of process 300. For example, a first computing system may train the embedding model 106 at block 304, while a second computing system trains the file format classifier 108 at block 310. The same, or different, computing systems may also execute the feature extractor 104 at block 302 and/or block 304, or execute the trained embedding model 106 at block 308.

After the embedding model 106 and the file format classifier 108 have been trained using the process 300 shown in FIG. 3, trained instances of the embedding model 106 and the file format classifier 108 can be deployed in instances of the file format identification system 100 that execute on one or more computing devices. For example, an instance of the file format identification system 100 that includes trained instances of the embedding model 106 and the file format classifier 108 can be executed to predict or determine a file format of binary data, as discussed below with respect to FIG. 4.

Figure 4:
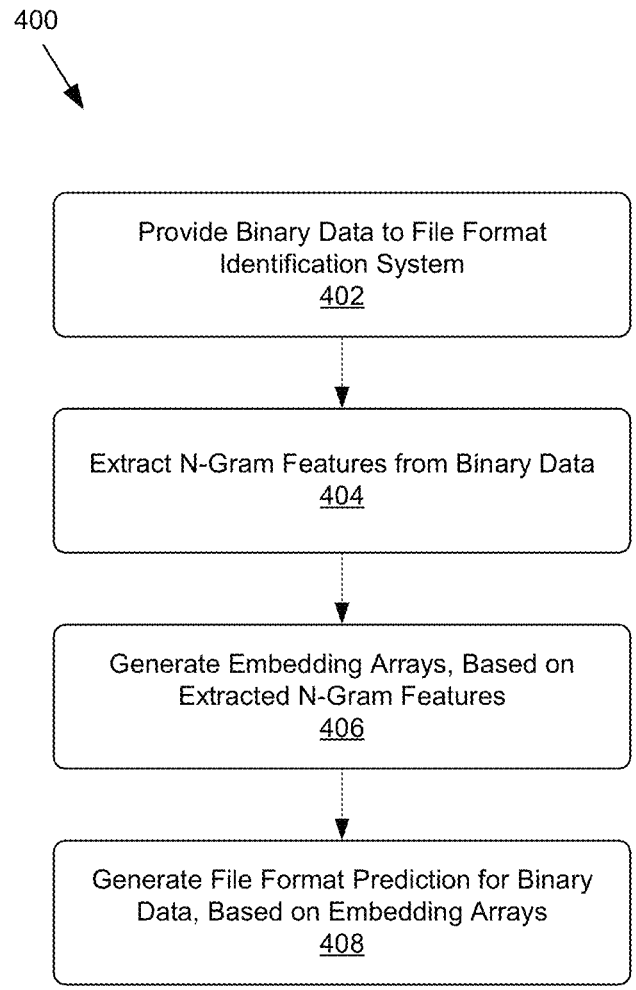
FIG. 4 shows a flowchart of an example process for predicting file formats associated with binary data.

FIG. 4 shows a flowchart of an example process 400 for predicting file formats associated with binary data. The example process 400 shown in FIG. 4 may be performed by a computing system, such as the computing system shown and described with respect to FIG. 5, configured to execute an instance of the file format identification system 100 that includes trained instances of the embedding model 106 and the file format classifier 108.

At block 402, the computing system can provide binary data 102 to the file format identification system 100. The binary data 102 can be a file, partial file, data stream, data dump, unstructured data, or any other type of binary data. In some examples, the computing system may lack metadata or other information indicating the file format associated with the binary data 102, and use the file format identification system 100 to determine the likely file format associated with the binary data 102. In other examples, the computing system may use the file format identification system 100 to verify the file format associated with the binary data 102, for instance to determine whether the binary data 102 has been altered to obfuscate the file format.

At block 404, the computing system can use the feature extractor 104 to extract n-gram features 110 from the binary data 102. As discussed above, the feature extractor 104 can be configured to extract byte n-grams from the binary data 102 using a 1-byte sliding window. The byte n-grams extracted from the binary data 102 by the feature extractor 104 at block 404 can be used, as n-gram features 110, as input to the trained embedding model 106.

At block 406, the computing system can use the trained embedding model 106 to generate embedding arrays 112 that correspond with the n-gram features 110 extracted from the binary data 102 at block 404. As discussed above, the embedding model 106 can have previously been trained to predict occurrences of n-gram features in a training set of data, such as the embedding model training data 116. However, one or more embedding layers of the embedding model 106 can have been trained to generate, from input n-gram features, embedding arrays 112 that a final layer of the embedding model 106 uses to predict the n-gram feature occurrence levels. Accordingly, at block 406 the embedding model 106 can use the one or more embedding layers to generate embedding arrays 112 that correspond to the n-gram features 110 extracted from the binary data 102 at block 404.

At block 408, the computing system can use the trained file format classifier 108 to generate, based on the embedding arrays 112 generated by the embedding model 106 at block 406, a file format prediction for the binary data 102. As described above, the file format classifier 108 may have been trained to identify spatial patterns, or other patterns, of multi-dimensional values in embedding arrays that are predictive of corresponding file formats. Accordingly, at block 408 the file format classifier 108 can compare multi-dimensional values indicated in the embedding arrays 112 generated at block 406 with previously-determined spatial patterns, or other patterns of values that the file format classifier 108 has been trained to associate with specific file formats. The file format classifier 108 can accordingly determine whether the embedding arrays 112 generated at block 406 contain values that fall into patterns the file format classifier 108 associates with any known file formats, and/or how closely such values fall into the patterns associated with the known file formats. The file format prediction generated at block 408 can accordingly indicate which of the known file formats, if any, are most likely to be associated with the binary data 102.

For example, the file format classifier 108 may determine similarity scores that indicate how closely the values in the embedding arrays 112 generated at block 406 correspond with values associated with known file formats. The file format prediction generated at block 408 can accordingly indicate one or more file formats associated with the highest similarity scores, such as file formats associated with similarity scores that are equal to or higher than corresponding threshold scores. If the file format classifier 108 determines that the values in the embedding arrays 112 are not sufficiently correlated with patterns associated with any of the known file formats the file format classifier 108 has been trained to identify, for instance if similarity scores associated with the known file formats are less than the corresponding threshold scores, the file format prediction may indicate that the binary data 102 is not likely to be associated with any of the file formats the file format classifier 108 has been trained to identify.

Accordingly, the file format prediction generated by the file format classifier 108 at block 408 can indicate file types likely to be associated with the binary data provided at block 402. As discussed above, the file format classifier 108 generates such file format prediction based on embedding arrays that correspond to extracted n-grams, and n-grams can be extracted from partial files, damaged files, altered files, or any other type of file. As such, the file format classifier 108 of the file format identification system 100 can generate a file format prediction for substantially any binary data, even if the format of the binary data does fully comply with a specification of a file format.

Figure 5:
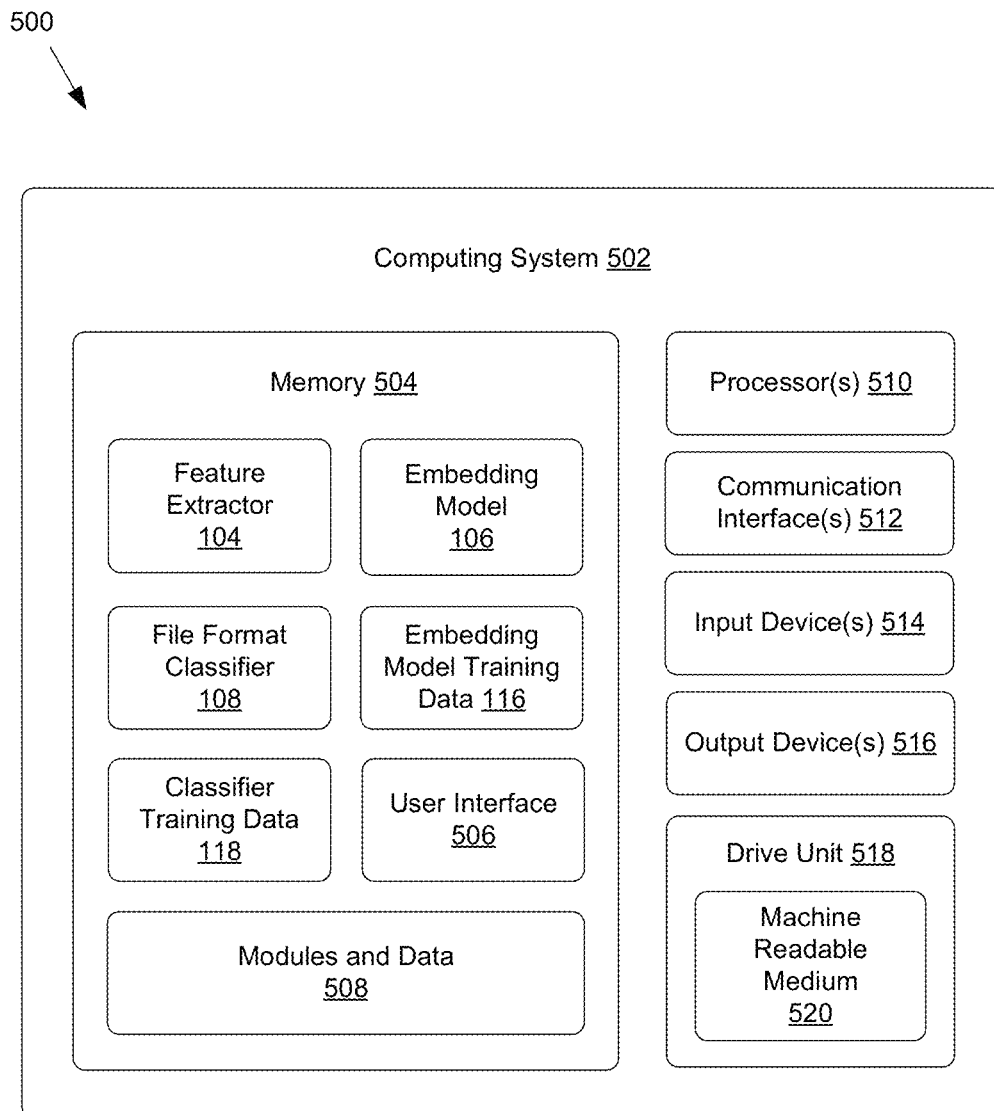
FIG. 5 shows an example system architecture for a computing system associated with the file format identification system.

FIG. 5 shows an example system architecture 500 for a computing system 502 associated with the file format identification system 100 described herein. The computing system 502 can include one or more servers, computers, or other types of computing device that can execute one or more elements of the file format identification system 100. In some examples, the computing system 502 can be configured to train elements of the file format identification system 100, such as the embedding model 106 and/or the file format classifier 108. In other examples, the computing system 502 can execute an instance of the file format identification system 100 that includes versions of the embedding model 106 and the file format classifier 108 that have already been trained. In some examples, elements of the file format identification system 100 can be distributed among multiple computing systems. For instance, a first computing system may execute the feature extractor 104 and/or the embedding model 106, while a second computing system executes the file format classifier 108.

The computing system 502 can include memory 504. In various examples, the memory 504 can include system memory, which may be volatile (such as RAM), non-volatile (such as ROM, flash memory, non-volatile memory express (NVMe), etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 502. Any such non-transitory computer-readable media may be part of the computing system 502.

The memory 504 can store data associated with the file format identification system 100, such as the feature extractor 104, the embedding model 106, the file format classifier 108, the embedding model training data 116, the classifier training data 118, a user interface 506 that can display the file format prediction 114 or other data associated with the file format identification system 100, and/or any other element of the file format identification system 100. The memory 504 can also store other modules and data 508. The modules and data 508 can include any other modules and/or data that can be utilized by the computing system 502 to perform or enable performing the actions described herein. Such modules and data 508 can include a platform, operating system, and applications, and data utilized by the platform, operating system, and applications.

The computing system 502 can also have one or more processors 510. In various examples, each of the processors 510 can be a central processing unit (CPU), a graphics processing unit (GPU), both a CPU and a GPU, or any other type of processing unit. Each of the one or more processors 510 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 510 may also be responsible for executing computer applications stored in the memory 504, which can be associated with types of volatile and/or nonvolatile memory. For example, the processors 510 can access data and computer-executable instructions stored in the memory 504, and execute such computer-executable instructions.

In some examples, the processors 510 can include one or more GPUs, and elements of the file format identification system 100 such as the embedding model 106 and/or the file format classifier 108 can be configured to execute on the GPUs. GPUs can be configured to matrix multiplication operations and/or other types of operations more quickly, more efficiently, and/or with less energy usage than CPUs. Accordingly, because the embedding layers of the embedding model 106 may use matrix multiplication operations and/or other operations that are more efficient on GPUs when generating embedding arrays 112, and/or the file format classifier 108 may use similar types of operations when processing the embedding arrays 112 to generate the file format prediction 114, such elements of the file format identification system 100 can be configured to execute on one or more GPUs of the computing system 502. However, in other examples, such elements of the file format identification system 100 can also, or alternately, be configured to execute on CPUs or other types of processors 510.

The computing system 502 can also have one or more communication interfaces 512. The communication interfaces 512 can include transceivers, modems, interfaces, antennas, telephone connections, and/or other components that can transmit and/or receive data over networks, telephone lines, or other wired or wireless connections. For example, the communication interfaces 512 can include one or more network cards or other network interfaces that can be used to receive the binary data 102 from other computing elements, or to transmit the file format prediction 114 to other computing elements.

In some examples, the computing system 502 can also have one or more input devices 514, such as a keyboard, a mouse, a touch-sensitive display, voice input device, etc. The computing system 502 can also have one or more output devices 516 such as a display, speakers, a printer, etc.

The computing system 502 may also include a drive unit 518 including a machine readable medium 520. The machine readable medium 520 can store one or more sets of instructions, such as software or firmware, that embodies any one or more of the methodologies or functions described herein. The instructions can also reside, completely or at least partially, within the memory 504, processor(s) 510, and/or communication interface(s) 512 during execution thereof by the computing system 502. The memory 504 and the processor(s) 510 also can constitute machine readable media 520.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   extracting, by one or more processors, a plurality of n-gram features from binary data;
   generating, by the one or more processors, and using an embedding model comprising a neural network having embedding layers and a final layer, a plurality of embedding arrays that correspond to the plurality of n-gram features, wherein:
   individual embedding arrays, of the plurality of embedding arrays, are generated by corresponding embedding layers of the neural network as input to subsequent embedding layers or the final layer; and
   generating, by the one or more processors, using a file format classifier, and based on the plurality of embedding arrays that correspond to the plurality of n-gram features, a file format prediction that indicates one or more file formats associated with the binary data.

2. The computer-implemented method of claim 1, wherein generating the file format prediction comprises:
   comparing, by the file format classifier, values indicated by the plurality of embedding arrays with multi-dimensional patterns of predetermined values that the file format classifier associates with a set of known file types; and
   determining, by the file format classifier, the one or more file formats associated with the binary data based on the values indicated by one or more of the plurality of embedding arrays that have at least a threshold similarity with the multi-dimensional patterns associated with the one or more file formats.

3. The computer-implemented method of claim 2, wherein:
   the file format classifier is a machine learning model different from the embedding model, and
   the file format classifier is trained, based on a training set of embedding arrays generated by the embedding model from reference n-grams of reference files of the set of known file types, to determine the multi-dimensional patterns of predetermined values associated with the set of known file types.

4. The computer-implemented method of claim 1, wherein the neural network of the embedding model is trained, based on a training set of data, to predict probabilities of occurrences of reference n-gram features in reference data objects in the training set of data.

5. The computer-implemented method of claim 1, wherein the binary data is at least one of a partial file, a corrupted file, a file without file format identification metadata, or an ill-formatted file that is not fully formatted according to a file format specification.

6. The computer-implemented method of claim 1, wherein the file format prediction identifies multiple file formats associated with the binary data.

7. The computer-implemented method of claim 1, wherein the file format prediction indicates one or more confidence levels associated with predictions that the one or more file formats are associated with the binary data.

8. The computer-implemented method of claim 7, wherein the one or more confidence levels are equal to, or greater than, corresponding threshold values associated with the one or more file formats.

9. A computing system, comprising:
one or more processors; and
memory storing computer-executable instructions that, when executed by the one or more processors, cause the one or more processors to perform operations comprising:
  extracting a plurality of n-gram features from binary data;
  generating, using an embedding model comprising a neural network having embedding layers and a final layer, a plurality of embedding arrays that correspond to the plurality of n-gram features, wherein:
    individual embedding arrays, of the plurality of embedding arrays, are generated by corresponding embedding layers of the neural network as input to subsequent embedding layers or the final layer; and
  generating, using a file format classifier, and based on the plurality of embedding arrays that correspond to the plurality of n-gram features, a file format prediction that indicates one or more file formats associated with the binary data.

10. The computing system of claim 9, wherein generating the file format prediction comprises:
comparing, by the file format classifier, values indicated by the plurality of embedding arrays with multi-dimensional patterns of predetermined values that the file format classifier associates with a set of known file types; and
determining, by the file format classifier, the one or more file formats associated with the binary data based on the values indicated by one or more of the plurality of embedding arrays that have at least a threshold similarity with the multi-dimensional patterns associated with the one or more file formats.

11. The computing system of claim 10, wherein:
the file format classifier is a machine learning model different from the embedding model, and
the file format classifier is trained, based on a training set of embedding arrays generated by the embedding model from reference n-grams of reference files of the set of known file types, to determine the multi-dimensional patterns of values associated with the set of known file types.

12. The computing system of claim 9, wherein the neural network of the embedding model is trained, based on a training set of data, to predict probabilities of occurrences of reference n-gram features in reference data objects in the training set of data.

13. The computing system of claim 9, wherein the binary data is at least one of a partial file, a corrupted file, a file without file format identification metadata, or an ill-formatted file that is not fully formatted according to a file format specification.

14. The computing system of claim 9, wherein the file format prediction indicates one or more confidence levels associated with predictions that the one or more file formats are associated with the binary data.

15. One or more non-transitory computer-readable media storing computer-executable instructions that, when executed by one or more processors associated with a file format identification system, cause the one or more processors to perform operations comprising:
  extracting a plurality of n-gram features from binary data;
  generating, using an embedding model comprising a neural network having embedding layers and a final layer, a plurality of embedding arrays that correspond to the plurality of n-gram features, wherein:
    individual embedding arrays, of the plurality of embedding arrays, are generated by corresponding embedding layers of the neural network as input to subsequent embedding layers or the final layer; and
  generating, using a file format classifier, and based on the plurality of embedding arrays that correspond to the plurality of n-gram features, a file format prediction that indicates one or more file formats associated with the binary data.

16. The one or more non-transitory computer-readable media of claim 15, wherein generating the file format prediction comprises:
comparing, by the file format classifier, values indicated by the plurality of embedding arrays with multi-dimensional patterns of predetermined values that the file format classifier associates with a set of known file types; and
determining, by the file format classifier, the one or more file formats associated with the binary data based on the values indicated by one or more of the plurality of embedding arrays that have at least a threshold similarity with the multi-dimensional patterns associated with the one or more file formats.

17. The one or more non-transitory computer-readable media of claim 16, wherein:
the file format classifier is a machine learning model different from the embedding model, and
the file format classifier is trained, based on a training set of embedding arrays generated by the embedding model from reference n-grams of reference files of the set of known file types, to determine the multi-dimensional patterns of values associated with the set of known file types.

18. The one or more non-transitory computer-readable media of claim 15, wherein the neural network of the embedding model is trained, based on a training set of data, to predict probabilities of occurrences of reference n-gram features in reference data objects in the training set of data.

19. The one or more non-transitory computer-readable media of claim 15, wherein the binary data is at least one of a partial file, a corrupted file, a file without file format identification metadata, or an ill-formatted file that is not fully formatted according to a file format specification.

20. The computer-implemented method of claim 1, wherein generating the file format prediction comprises:
determining, by the one or more processors, a spatial pattern indicated by values, corresponding to multiple dimensions, indicated by the plurality of embedding arrays, and
determining, by the one or more processors, and using the file format classifier, that the spatial pattern corresponds to predetermined spatial patterns associated with the one or more file formats.

* * * * *